United States Patent
Frushtick

(10) Patent No.: US 11,542,656 B2
(45) Date of Patent: Jan. 3, 2023

(54) METHOD OF FINISHING GARMENTS

(71) Applicant: LEONARD AUTOMATICS, INC., Denver, NC (US)

(72) Inventor: Jeffrey Neal Frushtick, Denver, NC (US)

(73) Assignee: LEONARD AUTOMATICS, INC., Denver, NC (US)

( * ) Notice: Subject to any disclaimer, the term of this patent is extended or adjusted under 35 U.S.C. 154(b) by 32 days.

(21) Appl. No.: 17/239,841

(22) Filed: Apr. 26, 2021

(65) Prior Publication Data

US 2021/0238796 A1    Aug. 5, 2021

Related U.S. Application Data

(62) Division of application No. 16/206,016, filed on Nov. 30, 2018, now Pat. No. 10,995,450.

(60) Provisional application No. 62/670,345, filed on May 11, 2018.

(51) Int. Cl.
*D06F 73/00* (2006.01)
*B65G 65/02* (2006.01)

(52) U.S. Cl.
CPC ............. *D06F 73/00* (2013.01); *B65G 65/02* (2013.01); *B65G 2201/0229* (2013.01)

(58) Field of Classification Search
CPC .......... D06F 73/00; D06F 73/02; D06F 95/00; B65G 65/02; B65G 2201/0229
USPC ............................................................ 68/5 r
See application file for complete search history.

(56) References Cited

U.S. PATENT DOCUMENTS

| | | | |
|---|---|---|---|
| 3,485,423 A | 12/1969 | Wagar et al. | |
| 3,644,085 A * | 2/1972 | Beeley | D06F 73/02 8/150 |
| 3,696,523 A | 10/1972 | Beeley et al. | |
| 4,300,366 A | 11/1981 | Barrett | |
| 6,481,603 B2 | 11/2002 | Gish | |
| 2007/0164061 A1 | 7/2007 | Carter | |

(Continued)

FOREIGN PATENT DOCUMENTS

| | | |
|---|---|---|
| EP | 0573726 B1 | 1/1997 |
| EP | 1889968 B1 | 1/2017 |

OTHER PUBLICATIONS

Written Opinion for PCT/US2019/013912; dated Apr. 15, 2019; 6 pages.

(Continued)

*Primary Examiner* — Tinsae B Ayalew
(74) *Attorney, Agent, or Firm* — Shumaker, Loop & Kendrick, LLP; S. Alexander Long, Jr.

(57) ABSTRACT

A method of finishing garments that includes the steps of providing an endless conveyor that transports a plurality of garment forms mounted on respective carriages successively through a garment loading zone, a steam zone for applying steam to the garments, a hot air zone for applying hot air to the garments as they pass through the hot air zone, a cool down zone for exposing the garments to cooling air, and an unloading zone where the operator removes the garment from the garment form. A plurality of form rotating stations are positioned at predetermined locations relative to the zones that rotate the forms between a position aligned with the direction of travel of the conveyor and perpendicular with the direction of travel of the conveyor.

12 Claims, 8 Drawing Sheets

(56) References Cited

U.S. PATENT DOCUMENTS

2011/0030426 A1   2/2011   Frushtick

OTHER PUBLICATIONS

International Search Report for PCT/US2019/013912; dated Apr. 15, 2019, 2 pages.
EP0573726B1—Machine translation (Year: 1997).

* cited by examiner

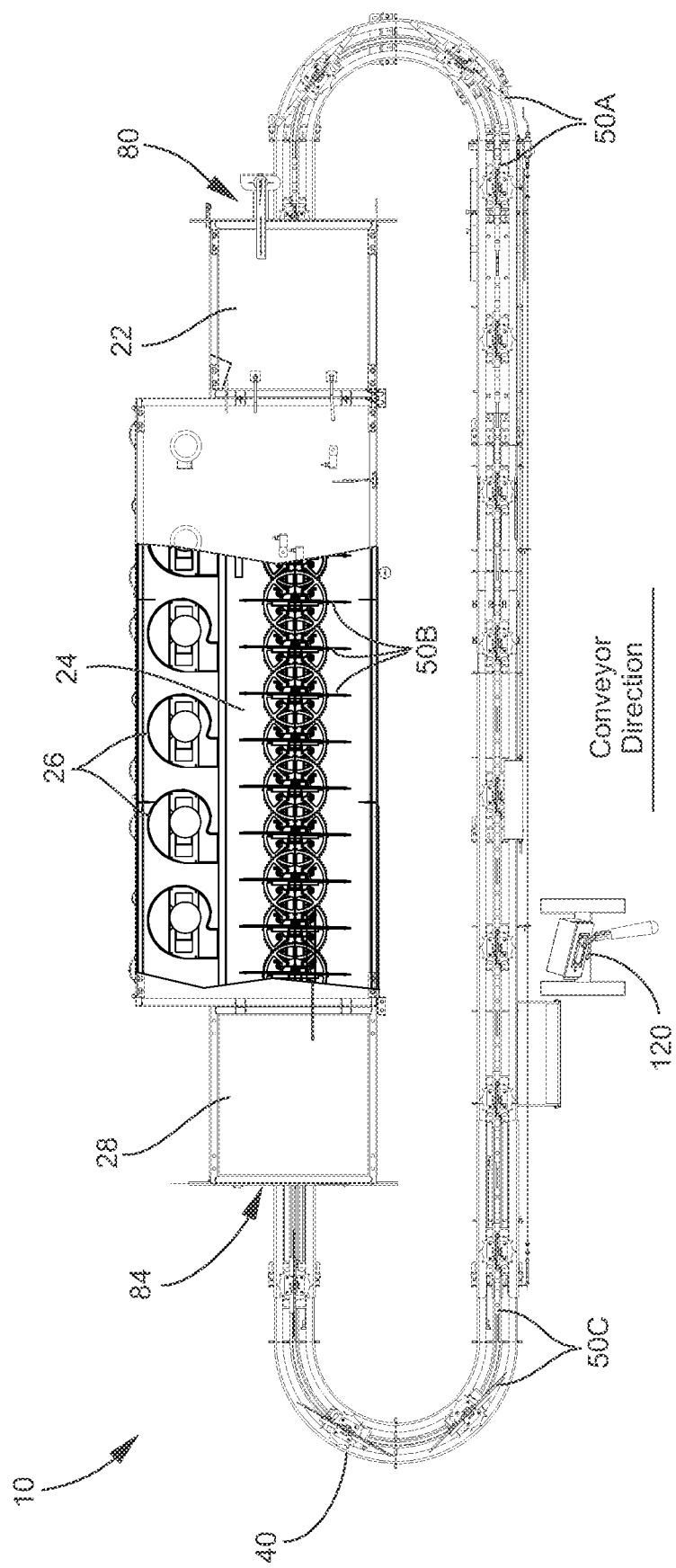

METHOD OF FINISHING GARMENTS

PRIORITY CLAIM

This application claims priority to and the benefit of U.S. Provisional Patent Application No. 62/670,345 filed 11 May 2018, and U.S. Utility patent application Ser. No. 16/206,016 filed 30 Nov. 2018, and U.S. Pat. No. 10,995,450 issued 4 May 2021, which this application is a divisional application, entitled "METHOD OF FINISHING GARMENTS", which is hereby incorporated herein in their entireties.

TECHNICAL FIELD AND BACKGROUND OF THE INVENTION

This invention relates to a garment finisher of the type used in garment manufacturing facilities to "finish" garments and put them in condition for folding, shipment and display. This principally involves removing wrinkles resulting from the manufacturing or laundering process. These machines are typically referred to as "tunnel finishers" and are well-known. More particularly, the invention changes the orientation of the garment form with respect to the conveyer during the cycle through the garment finisher machine.

Conventionally, after the manufacture of garments, physical labor is required to press garments for removing wrinkles. Some labor has been reduced by the development of tunnel finishers operating in an endless loop by means of a conveyor having spaced-apart forms on which the garments are placed, usually under tension. These tunnel finishers function by conveying the garment successively through several different zones, loading zone, steam zone, hot air zone, cool down zone and unloading zone.

Generally, a garment is loaded onto a form at the loading zone of the conveyer. As the garment moves along the conveyer, the garment is first conditioned with steam within a steam zone before proceeding to a hot air zone. In the hot air zone, the garment is heated and agitated with hot air to evaporate moisture from the garment. This process causes the fibers in the garment to return to their natural, relaxed, wrinkle-free condition. The garment then proceeds through a cool-down zone and finally comes to an unloading zone where the garment is removed from the form, folded and prepared for further downstream processing.

SUMMARY OF THE INVENTION

It is one object of the invention to provide a tunnel finisher that positions the garments in the hot air zone in a laterally-condensed position perpendicular to the path of the conveyor to enable a longer dwell time and smaller footprint of each form during drying.

It is another object of the invention to provide a tunnel finisher that positions the garments with the back of the garment facing the unloading operator to improve efficiency for folding of the garment, either manually or using automation.

It is another object of the invention to provide a tunnel finisher that rotates the garment form back to the garment loading position after the garment has been removed in the garment unloading zone.

These and other objects and advantages of the present invention are achieved in the preferred embodiments set forth below by providing a garment finisher having an endless conveyor that transports a plurality of garments mounted on rotatable garment forms spaced apart on respective carriages successively through a circuit having a garment loading zone, a steam zone for applying steam to the garments, a hot air zone for applying hot air to the garments, a cool down zone for exposing the garments to cooling air, and an unloading zone where the garments are removed from the forms. A plurality of turning stations are positioned at predetermined locations relative to the zones that rotate the forms between a position aligned with a conveyor direction of travel and a position perpendicular with the conveyor direction of travel during the circuit.

According to another embodiment of the invention, at least one turning station can rotate the forms ninety degrees between an outward facing garment loading orientation aligned with the conveyor direction of travel for movement through the loading and steam zones and a hot air zone orientation perpendicular to the conveyor direction of travel for reduced spacing between the plurality of forms in the hot air zone.

According to another embodiment of the invention, at least one turning station rotates the forms ninety degrees between a hot air zone orientation perpendicular to the conveyor direction of travel for reduced spacing between the plurality of forms in the hot air zone and an unloading orientation aligned with the conveyor direction of travel with the garment facing inward.

According to another embodiment of the invention, at least one turning station rotates the forms one hundred and eighty degrees between an unloading orientation with the garment facing inward and a loading orientation with the garment facing outward.

According to another embodiment of the invention, the carriages have a base wagon connected to a conveyor chain in a conveyor track that transports the forms through the circuit. A rotating gear is arranged with an axis of rotation perpendicular to the conveyor direction of travel and has a plurality of radially projecting gear teeth for engaging a plurality stationary members extending into a path of the conveyor at the turning stations and is adapted to successively engage the teeth as the forms move past the turning stations. A locking lever is connected between the wagon and the gear that is adapted to pivot between a steady state locked position engaging the gear to prevent gear rotation, and an unlocked position disengaged from the gear to allow gear rotation.

According to another embodiment of the invention, each base wagon has at least two wheels for connecting to the two side tracks positioned above the conveyor track.

According to another embodiment of the invention, the number of stationary members is one more than half of the number of gear teeth for a one hundred and eighty degree turn of the form.

According to another embodiment of the invention, the number of stationary members is one more than a quarter of the number of gear teeth for a ninety degree turn of the form.

According to another embodiment of the invention, the turning stations have a member extending partially into the conveyor path along at least one side of the conveyor track that is adapted to engage and raise one end of the locking lever on the forms that pass through the turning stations for pivoting the locking lever from the locked position to the unlocked position, while the form moves past the turning station.

According to another embodiment of the invention, the member is a bar having a trapezoid shape with symmetrical acute angles for providing a smooth pivot transition between the locked and unlocked position when the forms enter the turning station and between the unlocked and locked position when the forms exit the turning station.

According to another embodiment of the invention, a garment finisher is provided having an endless conveyor that transports a plurality of garments mounted on rotatable garment forms spaced apart on respective carriages successively through a circuit having a garment loading zone, a steam zone for applying steam to the garments, a hot air zone for applying hot air to the garments, a cool down zone for exposing the garments to cooling air, and an unloading zone where the garments are removed from the forms. A plurality of turning stations are positioned at predetermined locations relative to the zones that rotate the forms between a position aligned with a conveyor direction of travel and a position perpendicular with the conveyor direction of travel during the circuit. The carriages have a base wagon connected to a conveyor chain in a conveyor track that transports the forms through the circuit. A rotating gear is arranged with an axis of rotation perpendicular to the conveyor direction of travel and has a plurality of radially projecting gear teeth for engaging a plurality stationary members extending into a path of the conveyor at the turning stations and is adapted to successively engage the teeth as the forms move past the turning stations. A locking lever is connected between the wagon and the gear that is adapted to pivot between a steady state locked position engaging the gear to prevent gear rotation, and an unlocked position disengaged from the gear to allow gear rotation.

According to another embodiment of the invention, the garment forms have an outward facing garment loading orientation aligned with the conveyor direction of travel for movement through the loading zone and the steam zone, a hot air zone orientation perpendicular to the conveyor direction of travel for reduced spacing between the plurality of forms in the hot air zone, and a garment unloading orientation aligned with the conveyor direction of travel oriented one hundred and eighty degrees from the loading orientation for movement through the cool down zone and the unloading zone.

According to another aspect of the invention, a method is provided for finishing a garment in a tunnel finisher, including the steps of providing an endless conveyor that transports a plurality of garments mounted on rotatable garment forms spaced apart on respective carriages successively through a circuit having a garment loading zone, a steam zone, a hot air zone, a cool down zone, and an unloading zone, loading one garment onto one form in a loading orientation parallel to a conveyor path in the loading zone, and moving the form along the conveyor through the steam zone for applying a steam conditioning spray to the garment. The form is rotated ninety degrees to an orientation perpendicular to the conveyor path and the form is moved along the conveyor through the hot air zone in the perpendicular orientation for applying hot air to the garment. The form is rotated ninety degrees to the unloading orientation parallel to the conveyor path and moved along the conveyor through a cool down zone to an unloading zone. The garment is unloaded from the form in the unloading zone. The above steps are repeated for each garment to be finished.

According to another aspect of the invention, the tunnel finisher includes a plurality of spaced-apart forms that move sequentially from the garment loading zone to the garment unloading zone.

According to another aspect of the invention, the method includes the step of rotating the form one hundred and eighty degrees back to the loading orientation parallel to the conveyor after unloading the garment from the form in the unloading zone.

According to another aspect of the invention, the step of moving the garment form includes the steps of mounting the frame to a carriage connected to a conveyor chain in a central track of the conveyor, moving the conveyor chain along the central track of the conveyor, and rolling the carriage along the conveyor by two wheels connected to the carriage engaging with two side tracks positioned above the central track.

According to another aspect of the invention, the step of rotating the form includes the steps of mounting the form concentrically on a gear having a plurality of radially projecting teeth, moving the form past a turning station having a plurality of stationary members extending into the conveyor path and adapted for successively engaging the teeth as the form moves past the turning station, and rotating the gear as it moves past the turning station and the teeth engage the stationary members.

According to another aspect of the invention, the step of rotating the gear includes the steps of providing a locking lever connected below the gear having a downstream lever end and an upstream locking end with respect to the conveyor direction of travel in a steady state locked position with the locking end engaging the gear and preventing the gear from turning, and unlocking the gear by pivoting the locking end down to disengage the gear by raising the lever end upward due to contact with a bar extending partially into the conveyor path along the turning station.

According to another aspect of the invention, the bar has a trapezoid shape with symmetrical acute angles for providing a smooth pivot transition between the locked and unlocked position when the forms enter the turning station and between the unlocked and locked position when the forms exit the turning station.

According to another aspect of the invention, at least one turning station rotates the forms ninety degrees between a hot air zone orientation perpendicular to the conveyor direction of travel for reduced spacing between the plurality of forms in the hot air zone and an unloading orientation aligned with the conveyor direction of travel with the garment facing inward.

According to another aspect of the invention, a method for finishing a garment in a tunnel finisher is provided that includes the steps of providing an endless conveyor that transports a plurality of garments mounted on respective rotatable garment forms spaced apart on respective carriages successively through a circuit in the tunnel finisher having a garment loading zone, a steam zone, a hot air zone, a cool down zone, and a garment unloading zone, loading one garment onto one form in a loading orientation parallel to a conveyor path in the loading zone, and moving the form along the conveyor into and through the steam zone and applying a steam conditioning spray to the garment while in the steam zone. The form is rotated ninety degrees to an orientation perpendicular to the conveyor path and the form is moved along the conveyor into and through the hot air zone in the perpendicular orientation and applying hot air to the garment while in the hot air zone. The form is moved along the conveyor into the unloading zone and the form is rotated ninety degrees to the unloading orientation parallel to the conveyor path. The garment is unloaded from the form in the unloading zone and the above steps are carried out for each garment to be finished.

According to another aspect of the invention, the method includes the step of moving the form along the conveyor into and through the cool down zone and cooling the garment.

According to another aspect of the invention, the method includes the step of rotating the form one hundred and eighty degrees back to the loading orientation parallel to the conveyor after unloading the garment from the form in the unloading zone.

According to another aspect of the invention, the method includes the step of rotating the form two hundred and seventy degrees whereby a front of the garment on the form is presented to an operator in the unloading zone.

According to another aspect of the invention, the step of unloading the garment from the form is carried out by automation.

BRIEF DESCRIPTION OF THE DRAWINGS

FIG. 8 is a top plan view of a preferred embodiment of the garment finisher having two turning stations with automated unloading.

DETAILED DESCRIPTION OF THE PREFERRED EMBODIMENT

Figure 1:
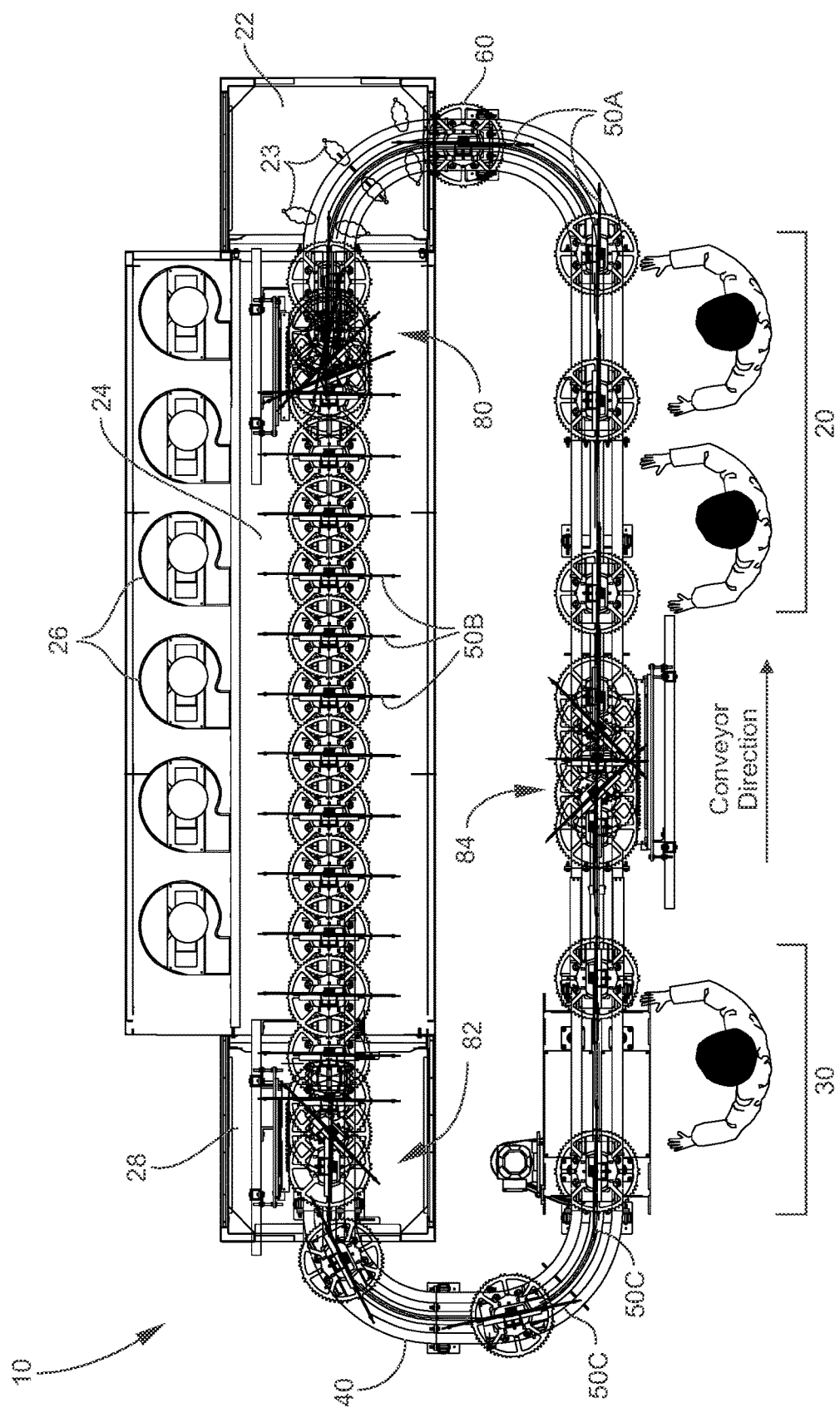
FIG. 1 is a top plan view of a preferred embodiment of the garment finisher.

Referring now to the drawings, FIG. 1 shows an entire circuit of a garment finisher 10 in the preferred embodiment. The garment finisher 10 conveys a large number of spaced-apart garment forms 50 along a path of a conveyer track 40 from a loading zone 20 to an unloading zone 30 on a closed loop circuit in a counterclockwise direction. Between the loading zone 20 and the unloading zone 30, the forms 50 are moved through an enclosure, i.e. the "tunnel," that houses a steam zone 22 where the garments are conditioned by a plurality of steam nozzles 23, a hot air zone 24 where the garments are dried by hot air blowers 26 for a specified dwell time, and a cool-down zone 28. The garments are loaded onto the forms 50 at the loading zone 20 and removed from the forms 50 at the unloading zone 30 after making a complete pass through the conveyor circuit in order to "finish" the garments for packaging, transport and/or sale.

The forms 50 are frames made to fit within the garments being finished and have a loading orientation 50a, a hot-air zone orientation 50b, and an unloading orientation 50c. The forms 50 can be designed to create tension in the garments for the finishing process. The forms 50 can also be hangars or other generic forms. Loading or unloading of the garments can be performed by an operator or by automation. The forms 50 can be designed such that the loading orientation 50a and the unloading orientation 50c are indistinguishable and garments can be loaded or unloaded from either orientation.

At the loading zone 20, the forms 50 are in the loading orientation 50a. In this orientation, the front of the loaded garments are facing outward toward an operator and move along the conveyor track 40 maintaining a position parallel to the conveyor direction of travel. This outward facing loading orientation 50a allows the operator to place garments on the forms 50 and access any fastening features that might exist on the garments. The forms 50 maintain this parallel orientation through the steam zone 22 which allows for closer positioning of steam injection by the nozzles 23 into the garments for a more complete steaming.

Figure 2:
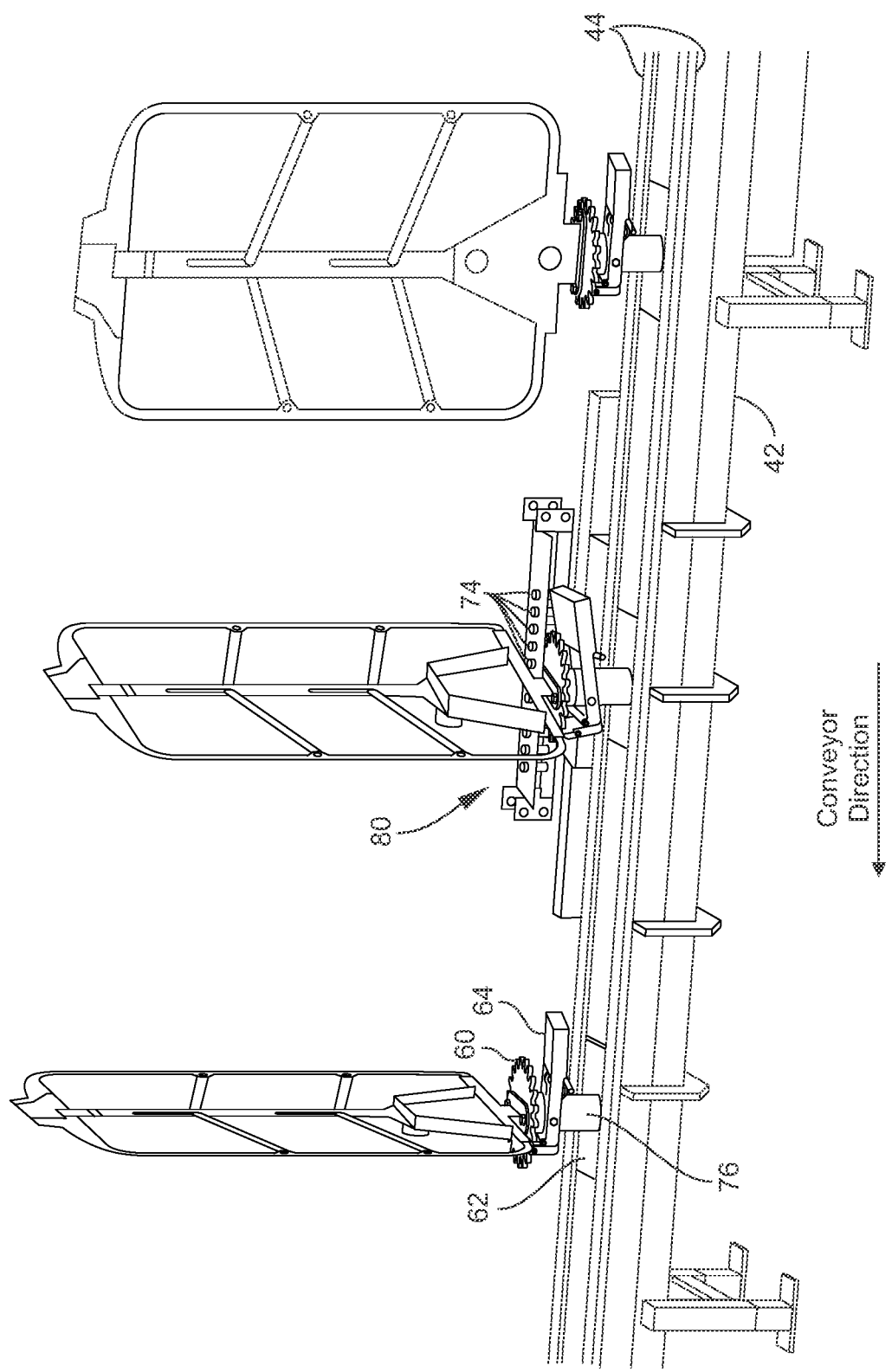
FIG. 2 is a fragmentary perspective view of the conveyor rotating a garment form through a first rotation sequence of ninety degrees.

As shown in FIGS. 1 and 2, after the steam zone 22 the forms 50 pass through a first turning station 80 where they are rotated ninety degrees to the hot air zone orientation 50b. Once rotated by the first turning station 80 the forms 50 are now perpendicular to the conveyor direction of travel which enables subsequent forms 50 to be laterally-condensed through the hot air zone 24. This closer spacing enables a longer dwell time within the hot air zone 24 for better garment finishing quality while using less floor space. With the longer dwell time the hot air zone 24 can be operated at a lower temperature, potentially resulting in energy savings.

After the hot air zone 24, the forms 50 are again rotated by ninety degrees into an unloading orientation 50c as they pass through a second turning station 82, exit the hot air zone 24 and enter the cool down zone 28. The unloading orientation 50c is parallel with the conveyor direction of travel and oriented one hundred and eighty degrees from the loading orientation 50a. In the unloading orientation 50c the garments are now facing away from the operator in the unloading zone 30. This unloading orientation 50c allows for a more seamless transition for the operator to remove the garments from the forms 50 without having to rotate the garments from their front side to their back side before folding the garments or for an automated folding machine to operate. In prior art machines, the fronts of the garments are presented to an unloading operator and the garments have to be rotated by hand to the back side in order to fold in the ordinary fashion.

Figure 3:
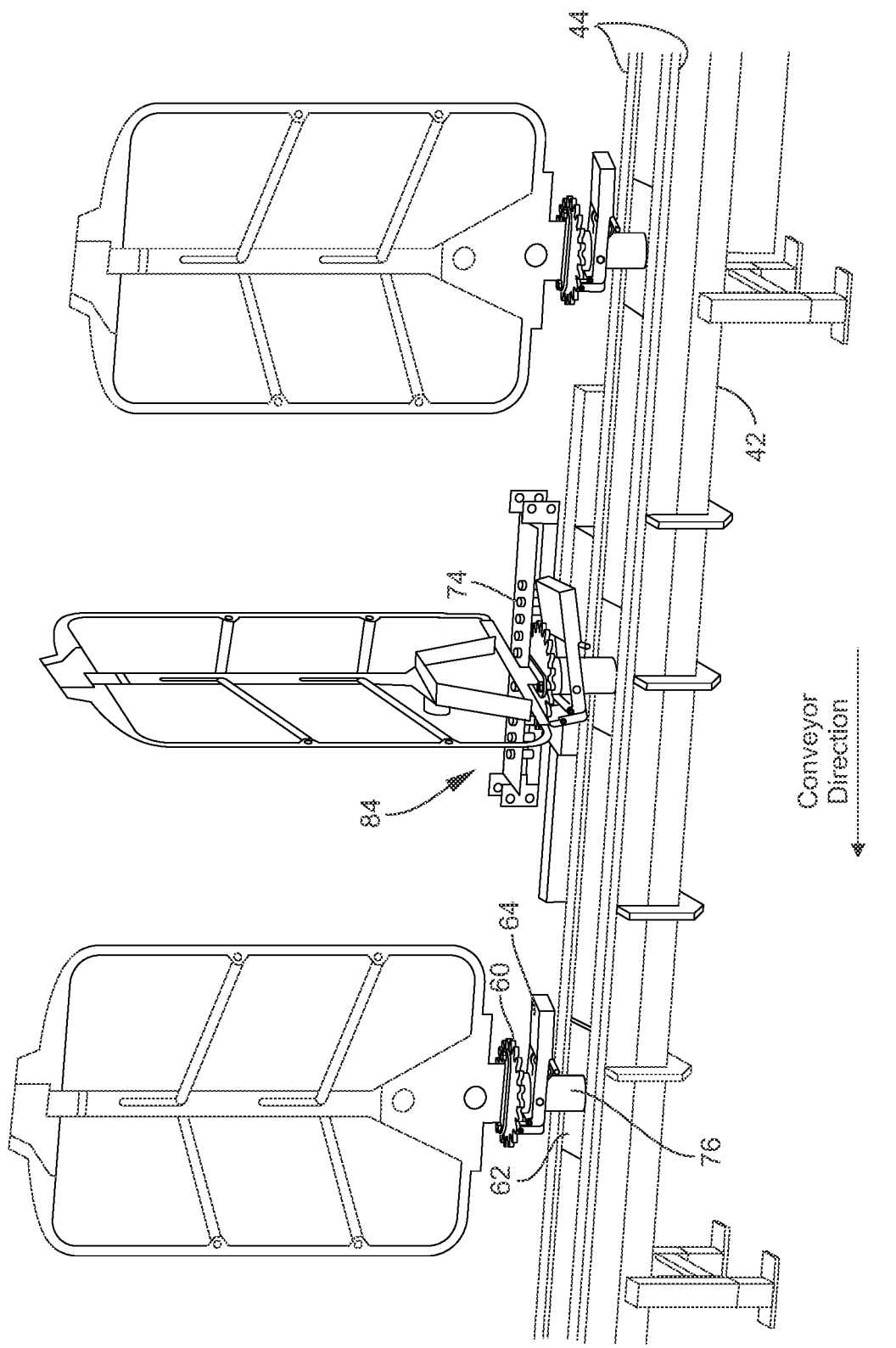
FIG. 3 is a fragmentary perspective view of the conveyor rotating a garment form through a third rotation sequence of one hundred and eighty degrees.

FIGS. 1 and 3 show a third, optional, turning station 84 located between the unloading zone 30 and the loading zone 20. Due to the closed circuit nature of the garment finisher 10 the forms 50 can have a design that must be rotated from the unloading orientation 50c back to the loading orientation 50a so that another garment can be loaded onto each of the forms 50 and carried through the garment finisher 10. The third turning station 84 rotates the forms 50 by one hundred and eighty degrees. This embodiment assumes a form 50 design that requires a different orientation for loading and unloading the garment.

Alternatively, fewer or additional turning stations can be included to process the garments in additional zones or the turning stations can accommodate rotations of more or less than ninety or one hundred and eighty degrees. In another alternative configuration, the second turning station 82 can rotate the forms 50 two hundred and seventy degrees so that the fronts of the garments are presented to the operator in the unloading zone 30.

Figure 4:
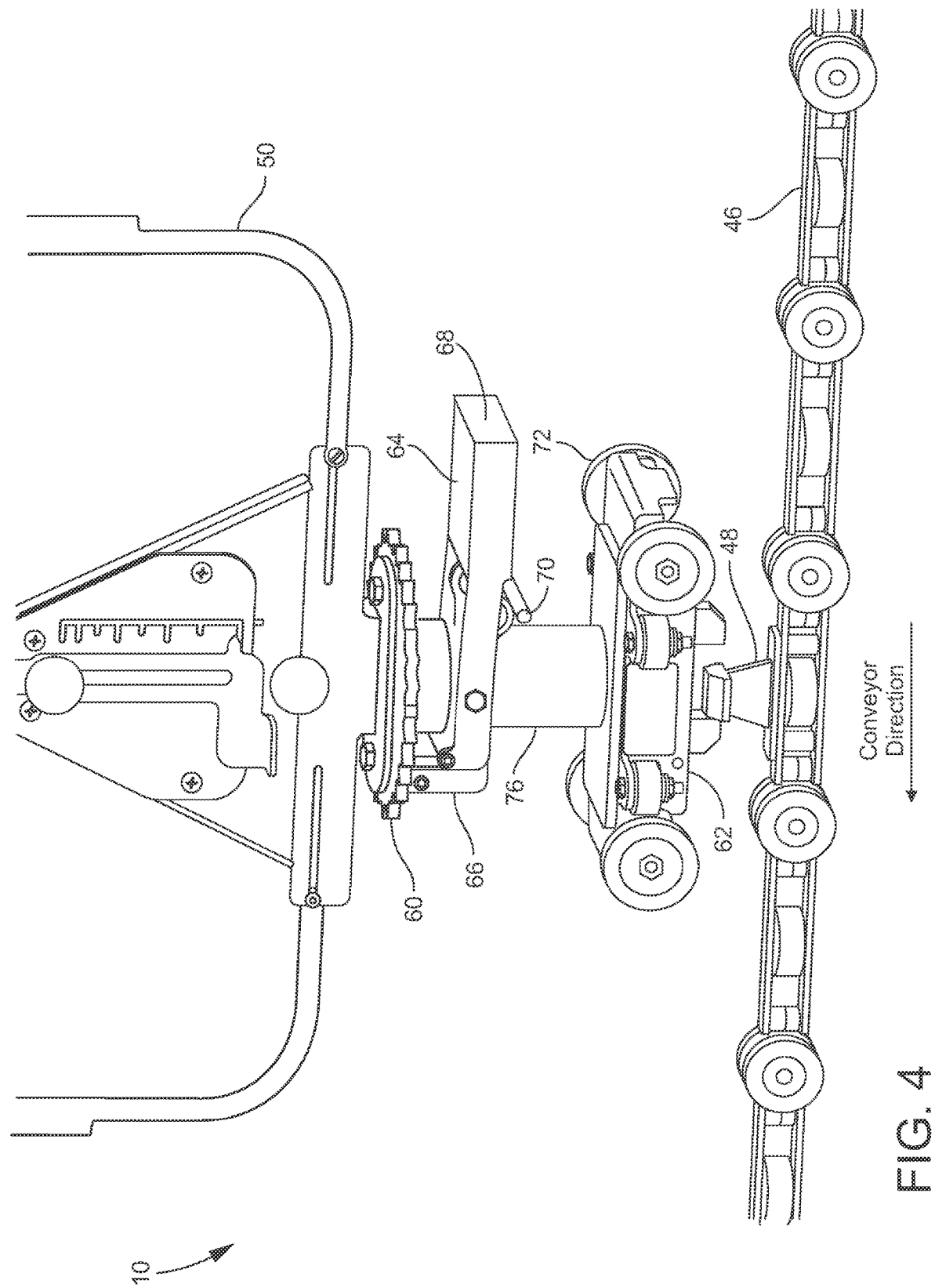
FIG. 4 is a fragmentary perspective view of the conveyor carriage of the garment form rotating apparatus.

Referring to FIGS. 2, 3, and 4, the forms 50 are transported through the conveyor circuit by a plurality of carriages that each includes a base wagon 62, a rotating gear 60, a locking lever mechanism 64, and a carriage connector 76. The conveyor track 40 is made up of one lower central track 42 and two upper side tracks 44. The wagons 62 are attached to a conveyor chain 46 that moves along the conveyor track 40. The chain 46 is housed within the lower track 42 and has multiple chain carriers 48 that are each capable of connecting to a wagon 62. Each wagon 62 has four wagon wheels 72 that roll along the side tracks 44. The spacing and number of chain carriers 48 and wagons 62 can vary for different sized garment finishers 10, different volume of garments to be finished, or different sized garments. In a specific embodiment the chain 46 can accommodate up to twenty six wagons 62. Additionally, other conveyor methods such as belt conveyors, roller conveyors, spiral conveyors, and magnetic conveyors can be used to move the wagon 62.

Figure 5:
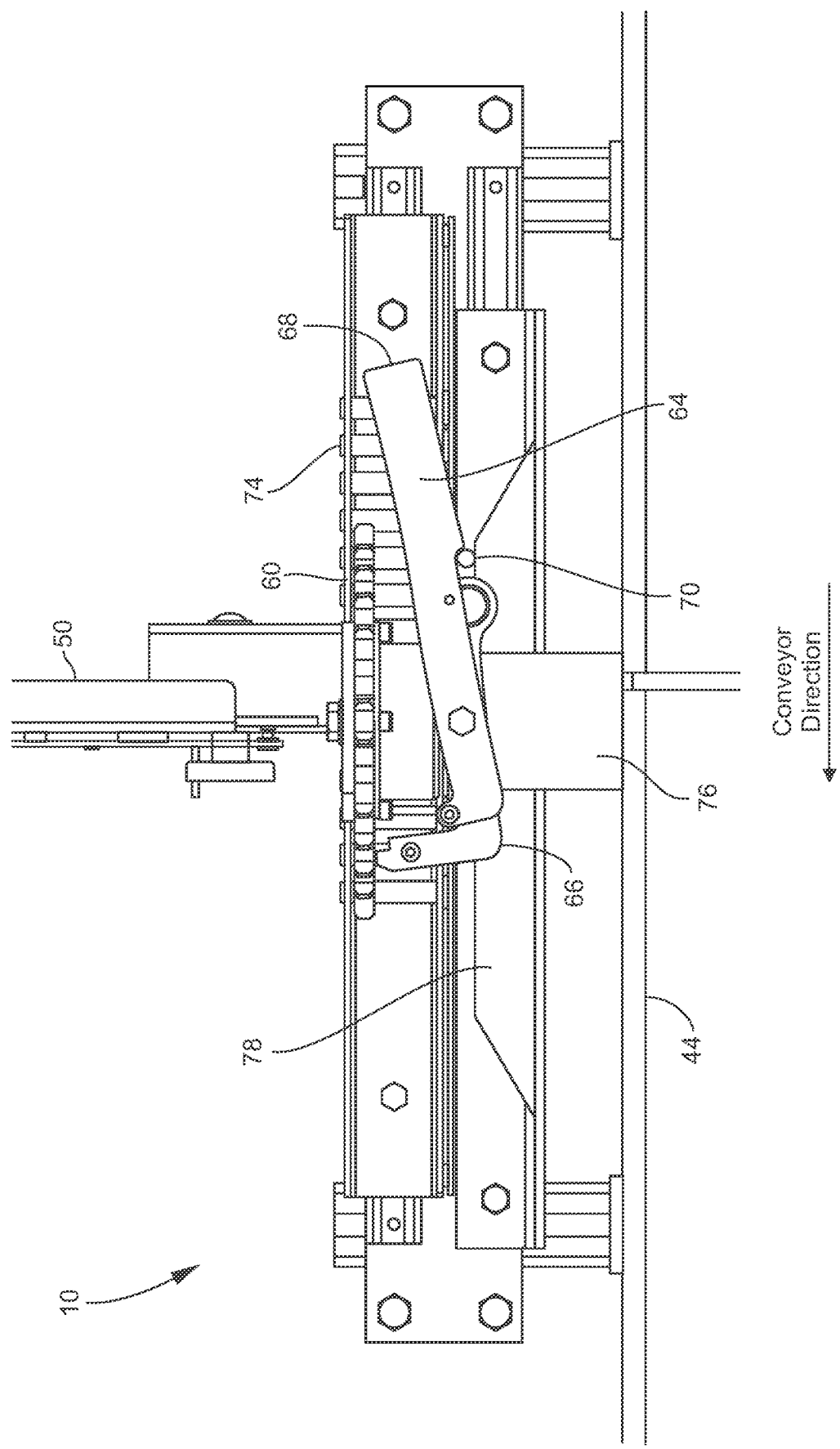
FIG. 5 is a side elevation view of one of the turning stations of the garment finisher.
Figure 6:
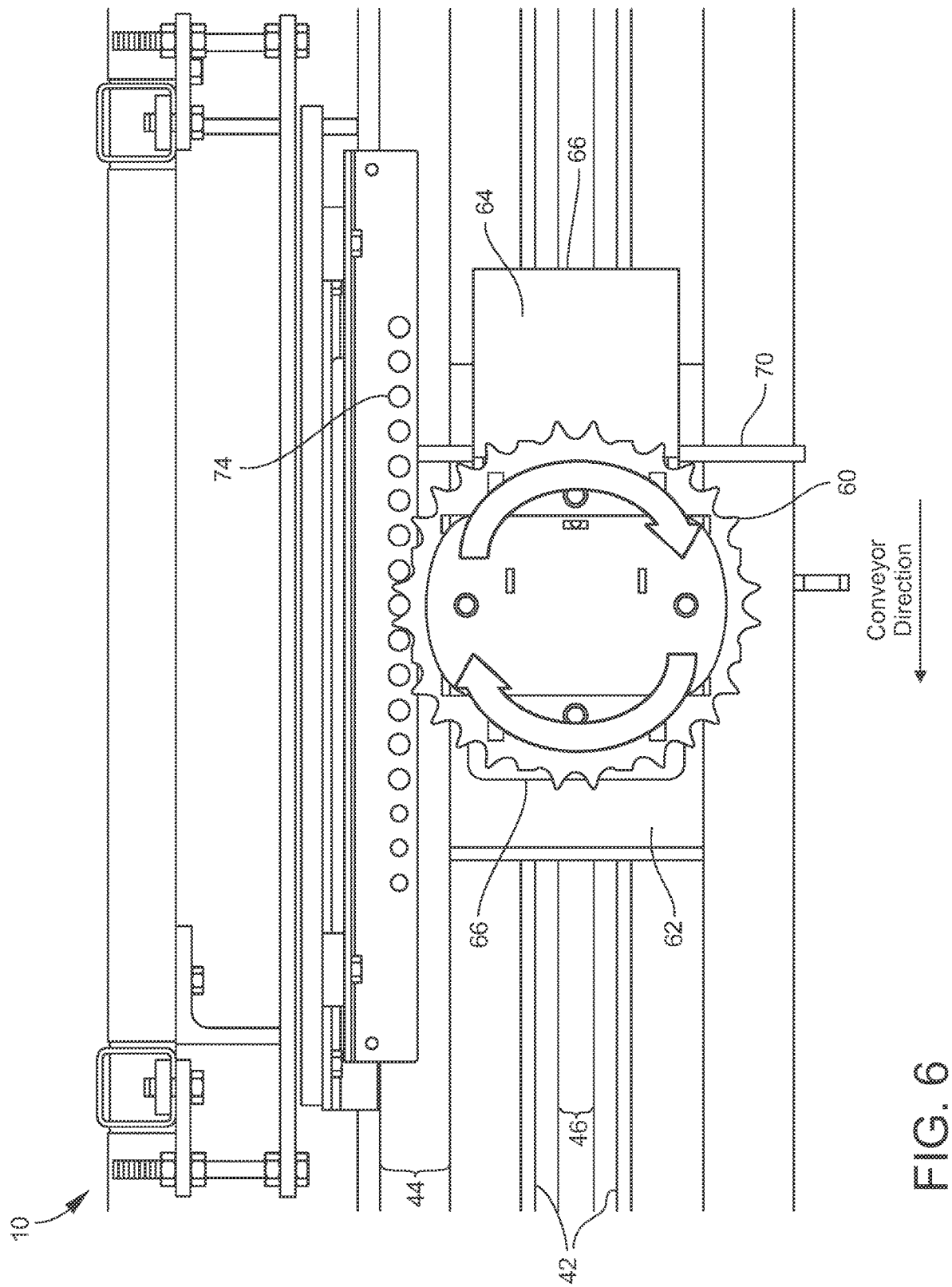
FIG. 6 is a cutaway top plan view of the turning station shown in FIG. 4.

As shown in FIGS. 4, 5, and 6, several additional components are connected between the forms 50 and the wagons 62 to enable the forms 50 to rotate as they pass through the turning stations 80, 82, 84. The carriage connectors 76 are connected to the wagons 62 and are in the form of upwardly extending cylindrical rods on which the gears 60 are concentrically mounted. The forms 50 are also concentrically mounted onto the gears 60. The carriage connectors 76 are fixed to the wagons 62 while the gears 60 and therefore the forms 50 are able to rotate about a central axis. This configuration allows for rotation of the gears 60 and the forms 50 around a central vertical axis while the wagons 62 are moving in the conveyor direction. The forms 50 rotate in a passive manner as they are carried through the turning stations 80, 82, 84 due to the gears 60 engaging with a plurality of stationary pins 74 extending into the conveyor path a sufficient distance to engage teeth on the gears 60. The pins 74 are held at a height above the side tracks 44 on one side of the circuit such that they align with the height of the gears 60. In the preferred embodiment, the turning stations 80, 84, 86 are located on the outside of the closed circuit with the pins 74 extending inward.

This rack and pinion style interaction enables the gears 60 and therefore the forms 50 to be rotated a desired amount based on the number of pins 74 at the turning stations 80, 82, 84. For a ninety degree rotation, such as in the first two turning stations 80, 82, the number of pins 74 required would be one more than a quarter of the number of teeth on the gears 60. Similarly, for the one hundred and eighty degree rotation of the third turning station 84, the number of pins 74 required would be one more than half the number of teeth on the gears 60. In a specific embodiment the gears 60 have twelve teeth and the first turning station 80 has 4 pins to rotate the form 50 by ninety degrees.

In order to prevent the forms 50 from rotating outside of the turning stations 80, 82, 84, locking levers 64 are included on each of the carriage connectors 76 between the wagons 62 and the gears 60. These locking levers 64 pivot between a locked, steady state position where the gears 60 are prevented from rotation, and an unlocked position where the gears 60 are able to rotate. The locking levers 64 have upstream locking ends 66 and downstream lever ends 68. While the forms 50 are being carried through the conveyor path between turning stations 80, 82, 84, the locking levers 64 maintain the locked position with the locking ends 66 engaging the teeth of the gears 60 to prevent rotation. The lever ends 68 maintain a relatively horizontal orientation. While in this locked position, the gears 60 are unable to rotate. This is the steady state position of the locking levers 64 in the absence of any external forces.

However, once the forms 50 reach any of the turning stations 80, 82, 84 the lever ends 68 of the locking levers 64 engage horizontal beams 78 to pivot the lever ends 68 in an upward direction. These beams 78 extend along the conveyor path for a specified length at the turning stations 80, 82, 84 and are located between the side track 44 and the pins 74. The locking levers 64 have arms 70 that extend from the lever ends 68 outward to engage with the beams 78 to raise the lever ends 68 and therefore disengage the locking ends 66 from the gears 60. Once the locking levers 64 have disengaged from the gears 60, the gears 60 are able to rotate as they pass through the turning stations 80, 82, 84 and engage the pins 74. The bars 78 have a trapezoidal shape with a sloped leading and trailing edge to enable a smooth transition when each form 50 enters and exits a turning station 80, 82, 84.

Figure 7:
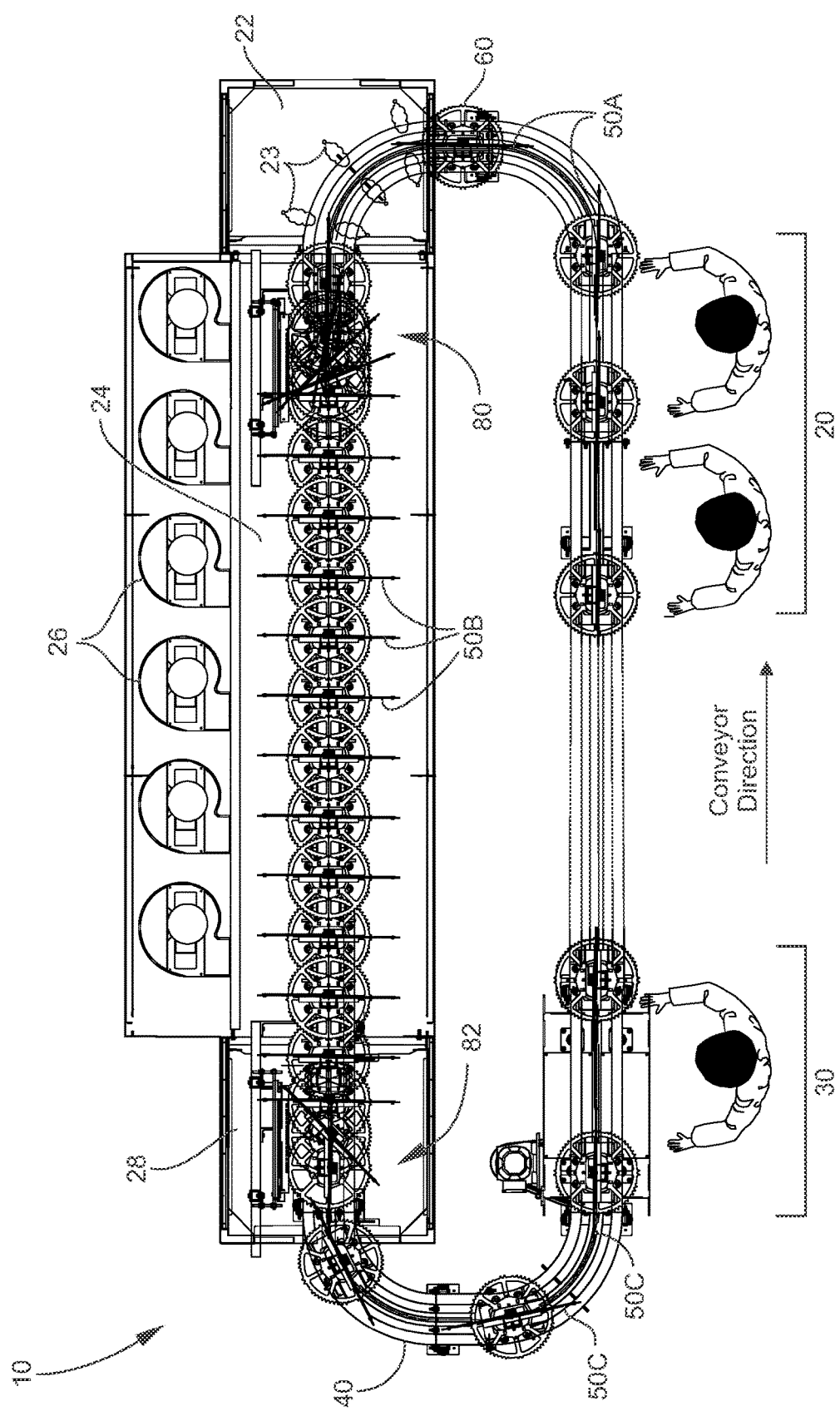
FIG. 7 is a top plan view of a preferred embodiment of the garment finisher having two turning stations.

FIG. 7 shows a preferred embodiment having two turning stations 80, 82. The forms 50 or garments can be designed such that there is no difference between the loading 50a and unloading 50c orientations. This eliminates the need for the third turning station 84. In this configuration the forms 50 pass from the unloading zone 30 to the loading zone 20 and maintain the same orientation.

FIG. 8 shows a preferred embodiment having only two turning stations, a human machine interface ('HMI') 120 for unloading, and a different entry configuration for the steam zone 22. The entry point for the steam zone 22 is not limited to the two embodiments shown in FIGS. 1 and 8 and can be optimized for the type of garment, the size and space of the steam equipment (22, 23) or for other design objectives. The first turning station 80 is located inside of the steam zone 22, but it can also be located before or after the steam zone 22. The HMI 120 is positioned between the exit of the cool-down zone 28 and the entry to the steam zone 22 and allows for the operator to either manually unload or load the garments on the forms 50 or for automation to be utilized in unloading and/or loading.

The garment finisher according to the invention requires less floor space and less capital investment for the customer by allowing a longer dwell time in the hot air zone, resulting in better quality in the finished garment and proper garment orientation upon exiting the finisher. The machine can be operated at a lower temperature due to the longer dwell time, potentially resulting in energy savings.

A garment finisher according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A method for finishing a garment in a tunnel finisher, comprising the steps of:
   (a) providing an endless conveyor that transports a plurality of garments mounted on rotatable garment forms spaced apart on respective carriages successively through a circuit having a garment loading zone, a steam zone, a hot air zone, a cool down zone, and an unloading zone;
   (b) loading one garment onto one form in a loading orientation parallel to a conveyor path in the loading zone;
   (c) moving the form along the conveyor through the steam zone for applying a steam conditioning spray to the garment;
   (d) rotating the form ninety degrees to an orientation perpendicular to the conveyor path;

(e) moving the form along the conveyor through the hot air zone in the perpendicular orientation for applying hot air to the garment;
(f) rotating the form ninety degrees to the unloading orientation parallel to the conveyor path;
(g) moving the form along the conveyor through a cool down zone to an unloading zone;
(h) unloading the garment from the form in the unloading zone; and
(i) repeating steps (b)-(h) for each garment to be finished.

2. The method of claim 1, further comprising the step of rotating the form one hundred and eighty degrees back to the loading orientation parallel to the conveyor after unloading the garment from the form in the unloading zone.

3. The method of claim 1, wherein the step of moving the garment form includes the steps of:
(a) mounting a frame to a carriage connected to a conveyor chain in a central track of the conveyor;
(b) moving the conveyor chain along the central track of the conveyor; and
(c) rolling the carriage along the conveyor by two wheels connected to the carriage engaging with two side tracks positioned above the central track.

4. The method of claim 3, wherein the step of rotating the form includes the steps of:
(a) mounting the form concentrically on a gear having a plurality of radially projecting teeth;
(b) moving the form past a turning station having a plurality of stationary members extending into the conveyor path and adapted for successively engaging the teeth as the form moves past the turning station; and
(c) rotating the gear as it moves past the turning station and the teeth engage the stationary members.

5. The method of claim 4, wherein the step of rotating the gear includes the steps of:
(a) providing a locking lever connected below the gear having a downstream lever end and an upstream locking end with respect to the conveyor direction of travel in a steady state locked position with the locking end engaging the gear and preventing the gear from turning; and
(b) unlocking the gear by pivoting the locking end down to disengage the gear by raising the lever end upward due to contact with a bar extending partially into the conveyor path along the turning station.

6. The method of claim 5, wherein the bar has a trapezoid shape with an symmetrical acute angles for providing a smooth pivot transition between the locked and unlocked position when the forms enter the turning station and between the unlocked and locked position when the forms exit the turning station.

7. The method of claim 5, wherein at least one turning station rotates the forms ninety degrees between a hot air zone orientation perpendicular to the conveyor direction of travel for reduced spacing between the plurality of forms in the hot air zone and an unloading orientation aligned with the conveyor direction of travel with the garment facing inward.

8. The method of claim 7, including the step of moving the form along the conveyor into and through the cool down zone and cooling the garment.

9. The method of claim 7, and including the step of rotating the form two hundred and seventy degrees whereby a front of the garment on the form is presented to an operator in the unloading zone.

10. The method of claim 7, wherein the step of unloading the garment from the form is carried out by automation.

11. A method for finishing a garment in a tunnel finisher, comprising the steps of:
(a) providing an endless conveyor that transports a plurality of garments mounted on respective rotatable garment forms spaced apart on respective carriages successively through a circuit in the tunnel finisher having a garment loading zone, a steam zone, a hot air zone, a cool down zone, and a garment unloading zone;
(b) loading one garment onto one form in a loading orientation parallel to a conveyor path in the loading zone;
(c) moving the form along the conveyor into and through the steam zone and applying a steam conditioning spray to the garment while in the steam zone;
(d) rotating the form ninety degrees to an orientation perpendicular to the conveyor path;
(e) moving the form along the conveyor into and through the hot air zone in the perpendicular orientation and applying hot air to the garment while in the hot air zone;
(f) moving the form along the conveyor into the unloading zone;
(g) rotating the form ninety degrees to the unloading orientation parallel to the conveyor path;
(h) unloading the garment from the form in the unloading zone; and
(i) repeating steps (b)-(h) for each garment to be finished.

12. The method of claim 11, further comprising the step of rotating the form one hundred and eighty degrees back to the loading orientation parallel to the conveyor after unloading the garment from the form in the unloading zone.

\* \* \* \* \*